United States Patent [19]

Kinsel

[11] 3,755,676

[45] Aug. 28, 1973

[54] SPACIALLY MULTIPLEXED OPTICAL BEAM COMMUNICATION SYSTEM

[75] Inventor: Tracy Stewart Kinsel, Martinsville, N.J.

[73] Assignee: Bell Telephone Laboratories, Incorporated, Murray Hill, N.J.

[22] Filed: Jan. 24, 1972

[21] Appl. No.: 219,959

[52] U.S. Cl. ............ 250/199, 350/162 SF, 350/169
[51] Int. Cl. ............................................ H04b 9/00
[58] Field of Search ................ 250/199; 179/15 BA; 350/169, 162 SF

[56] References Cited

UNITED STATES PATENTS 3,532,890 10/1970 Denton .............................. 250/199
3,612,658 10/1971 Slaymaker ........................ 350/162 SF

*Primary Examiner*—Robert L. Griffin
*Assistant Examiner*—Marc E. Bookbinder
*Attorney*—W. L. Keefauver et al.

[57] ABSTRACT

A plurality of optical beams, encoded to have different spacially varying intensity profiles, are launched along a common wavepath. At the receiver, demultiplexing is effected by means of a converging lens which performs a two-dimensional Fourier transformation upon the multiplexed beams, producing an array of spots at the focal plane of the lens which uniquely identifies and separates the plurality of beams. It is an advantage of such a system that the spot locations are not affected by small displacements of the beams off the path axis.

9 Claims, 7 Drawing Figures

PATENTED AUG 28 1973 3,755,676

SHEET 3 OF 3

SPACIALLY MULTIPLEXED OPTICAL BEAM COMMUNICATION SYSTEM

This invention relates to spacially multiplexed optical communication systems.

BACKGROUND OF THE INVENTION

The development of various types of lasers and light emitting diodes as sources of electromagnetic wave energy in the infrared, visible and ultraviolet portions of the frequency spectrum, hereafter to be referred to collectively as "optical" waves, makes possible the use of such waves as the carrier signal in a communication system. However, the utilization of optical waves in this manner is dependent upon the availability of an efficient transmission system. At present, the various means proposed for sending optical waves over long distances, including sequences of dielectric or gas lenses, periscopically aligned mirrors, and optical fibers, are all relatively expensive. However, the cost of transmitting information along any of these transmission systems would be significantly reduced if a sufficiently large number of optical beams could be simultaneously transmitted therealong. This technique, known as multiplexing, to be useful, must itself not add unduly to the cost of the system.

It is, accordingly, the broad object of the present invention to spacially multiplex a plurality of optical beams along a common wavepath.

It is a more specific object of the invention to effect spacial multiplexing by simple, inexpensive means that are not adversely affected by parameter changes along the wavepath.

SUMMARY OF THE INVENTION

The present invention is based upon the inherent ability of a converging lens to perform two-dimensional spacial Fourier transformations.

As is well known, any carrier signal, whose phase or amplitude is modulated as a function of time, can be uniquely defined by its frequency spectrum. The latter is merely the Fourier transform of the temporal function. In like fashion an optical beam, whose intensity profile is amplitude modulated as a function of two-dimensional space, (i.e., having intensity variations per unit distance along each of two, mutually orthogonal, transverse directions) can be uniquely defined by means of a spacial frequency spectrum. The resolution of a spacially modulated beam into component beams having a particular spacial distribution corresponding to its spacial frequency content, is similarly arrived at by means of a Fourier transformation. Specifically, the present invention employs the Fourier transforming properties of a converging lens as a means of demultiplexing a plurality of optical beams.

Thus, in a communication system in accordance with the present invention, a plurality of information modulated optical beams are encoded with a different spacial modulation and then combined for transmission along a common wavepath. At the receiver, demultiplexing is accomplished by means of a converging lens which performs a Fourier transformation operation, producing a spacial array of beam components for each of the spacially encoded beams. Since each array of beam components is different than every other array of beam components, the individual beams can be readily identified and separated, and the information modulation impressed upon the beams individually recovered.

In a first specific embodiment of the invention, the component beams are focused upon an array of photodetectors located in the focal plane of the lens. In a second embodiment of the invention, an array of optical fibers, whose input ends are located in the focal plane of the lens, are employed to couple to the beam components of each of the multiplexed beams.

It is an advantage of the present invention that the encoding apparatus can be a simple grating having a sinusoidally varying transmittance along one direction for each multiplexed beam, while demultiplexing merely utilizes the inherent properties of the last lens in the waveguiding system or, at most, an additional lens if the waveguide has an even number of lenses, or if the wavepath terminates with a section of optical fiber.

It is another advantage of the invention that small displacements of the beam off axis merely produce a phase change, but do not produce a change in the spacial distribution of the beam components. Thus, the system, is relatively unaffected by parameter changes along the wavepath.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
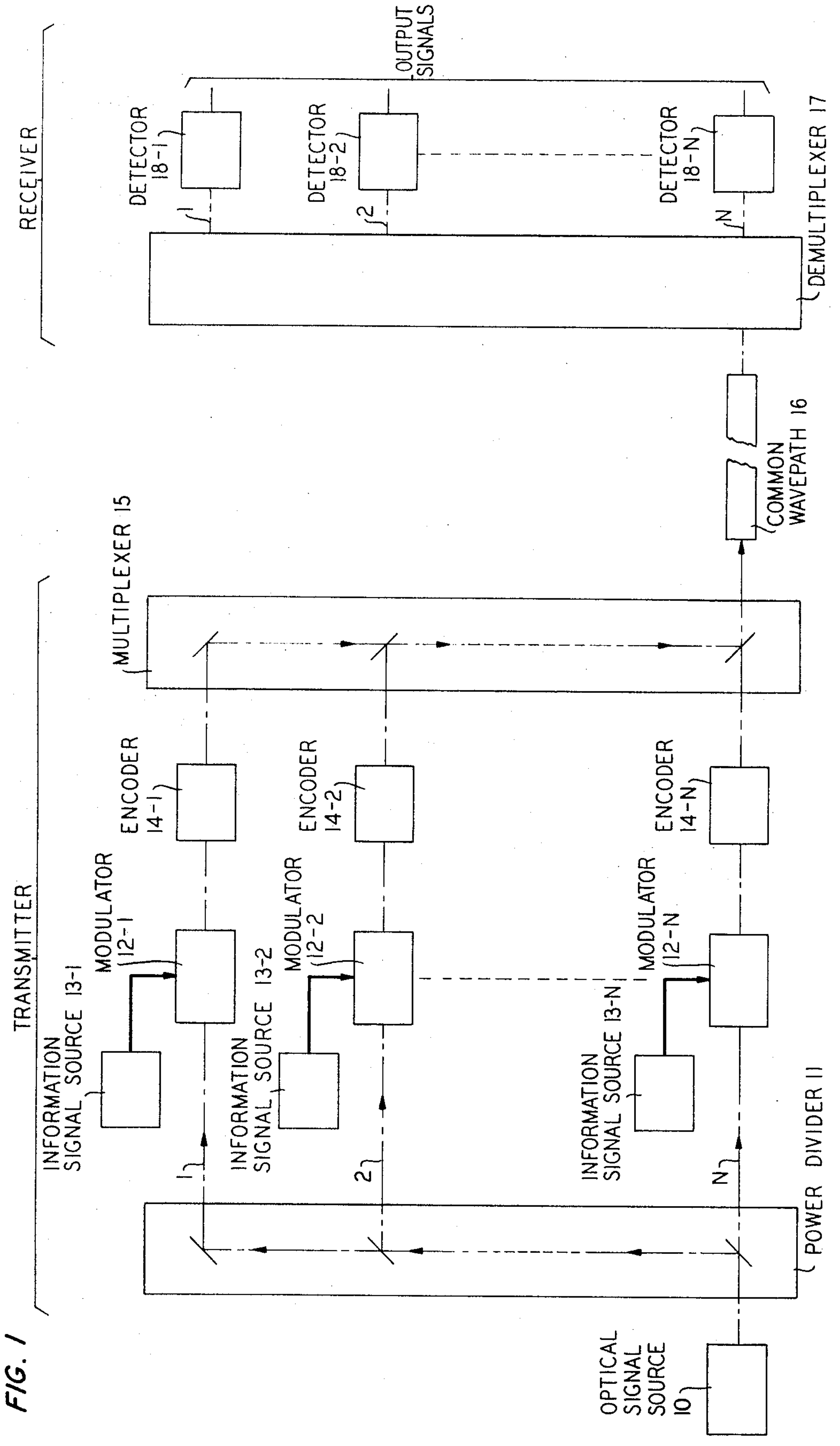
FIG. 1 shows, in block diagram, the elements of a spacially multiplexed optical communication system.

Referring to the drawings, FIG. 1 shows, in block diagram, the elements of a spacially multiplexed optical communication system. Typically, such a system includes at the transmitter end: a source 10 of optical wave energy; a power divider 11, comprising a first array of mirrors and beam splitters of varying transmissivity, for dividing the optical wave derived from source 10 into a plurality of N separate beams or channels of equal optical intensity; a plurality of N modulators 12-1, 12-2 . . . 12-N for separately modulating the N optical beams in response to the signal derived from N information signal sources 13-1, 13-2 . . . 13-N; a plurality of N encoders 14-1, 14-2 . . . 14-N for spacially encoding the N modulated optical beams so that they can be later identified at the receiver; and a multiplexer 15, comprising a second array of mirrors and beam splitters, for spacially combining the N beams in a manner to permit their propagation along a common wavepath 16.

At the receiver end of wavepath 16, the multiplexed beams are separated by means of a demultiplexer 17. The resulting N optical signals are, typically, demodulated by means of detectors 18-1, 18-2 . . . 18-N, producing N output signals which are then separately available for further utilization in accordance with the requirements of the particular communication system.

The present invention, which relates to the encoders 14 and demultiplexer 17, is based upon the known fact that a converging lens has the remarkable and useful property of performing two-dimensional Fourier transformations. Just as the frequency spectrum of a time varying function can be derived by means of a Fourier transformation, one can obtain the spacial frequency spectrum of a spacially varying function. This technique, which has been used heretofore as a means of effecting spacial filtering of optical waves, is used herein in the manner to be described, as a means of demultiplexing a plurality of spacially multiplexed optical beams.

Figure 2:
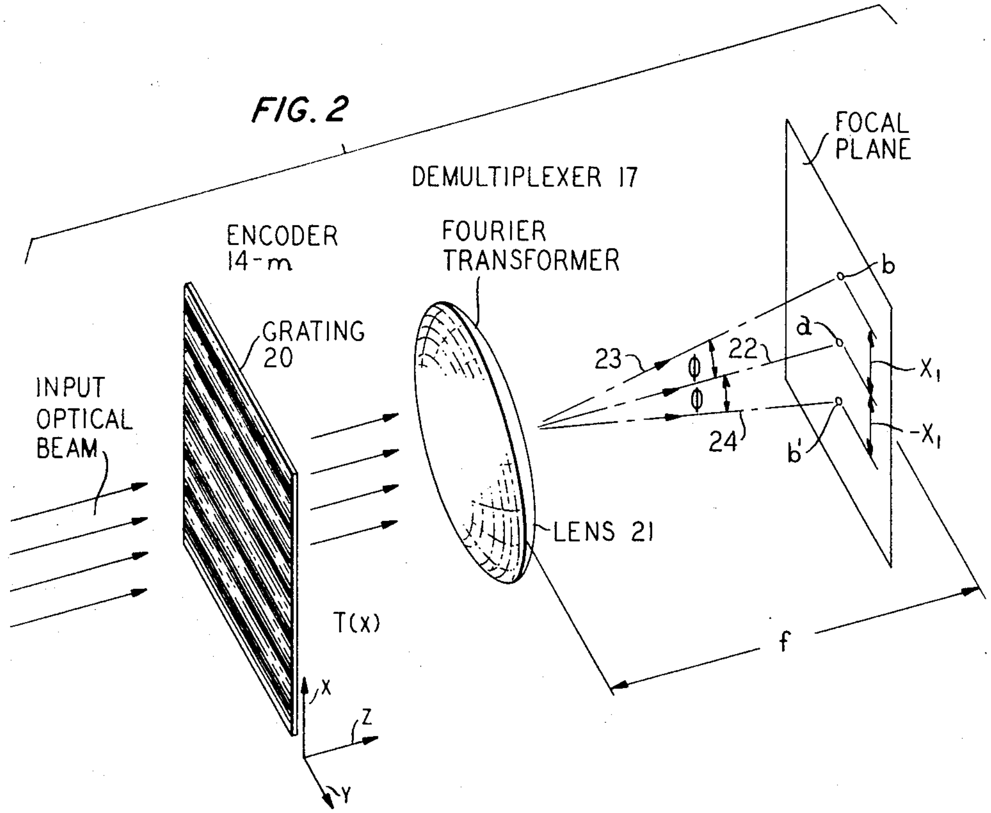
FIG. 2 shows one of the encoders and a demultiplexer in accordance with the present invention.

The principle involved is illustrated in FIG. 2 which shows one of the encoders 14-*m* and demultiplexer 17, in accordance with the present invention. For purposes of explanation, they are shown located in an $x$-$y$-$z$ coordinate system, where $x$ and $y$ define two, mutually perpendicular directions transverse to the direction of beam propagation, z.

In principle, each encoder is characterized by a different transmission characteristic $T(x,y)$ which modulates the intensity profile of an incident beam along the $x$ and $y$ directions. The Fourier transform of such a spacially modulated beam comprises an array of beam components whose directions of propagation, relative to the $z$ axis, are uniquely defined by the spacial frequency content of the transmission function $T(x,y)$. For purposes of illustration, the encoder in FIG. 2 comprises a grating 20 having a transmittance variation $T(x)$ in the $x$ direction only, given by $$T(x) = \tfrac{1}{2}\,[1 + \mathrm{Cos}(2\pi f_1 x)], \quad (1)$$

where $f_1$ is the spacial frequency of the transmittance variations. The transmittance is a constant along the $y$ direction and, at any point $x_n$, is given by $$T_n = T(x_n)\ . \quad (2)$$

The demultiplexer, located at the receiver, comprises a converging lens 21 functioning as a Fourier transformer.

Lens 21 can be the last lens in the waveguiding system connecting the receiver to the transmitter, or it can be a separate lens included between wavepath 16 and the rest of the receiver. This would be required, for example, if wavepath 16 included an even number of converging lens, or if wavepath 16 terminated in a section of optical fiber.

In operation, each of the optical beams is passed through a different grating, producing a plurality of spacially modulated beams. Each beam is thus uniquely encoded and, for the particular encoding defined by equations 1 and 2, is transformed into three beam components by lens 21, as evidenced by the three arrows 22, 23, and 24. One component 22 is directed parallel to the $z$ direction. The other two components 23 and 24 are directed parallel to the $x$–$z$ plane, at angles $\phi$ and $-\phi$, respectively, to the $z$ direction.

The beam components are, in addition, focused by lens 21, producing three spots $a$, $b$ and $b'$ at the focal plane of the lens. If the comparison made hereinabove between the frequency spectrum of a carrier signal modulated as a function of time, and the spacial spectrum of a spacially modulated optical beam is extended, the center spot, $a$, which contains one-half the beam energy, may be regarded as having been made by the "carrier" beam component, and the two other spots $b$ and $b'$, symmetrically located a distance $x_1$ and $-x_1$ to either side of the carrier beam, may be regarded as having been made by the spacial "sidebands" produced by the spacial modulation $f_1$.

Figure 3:
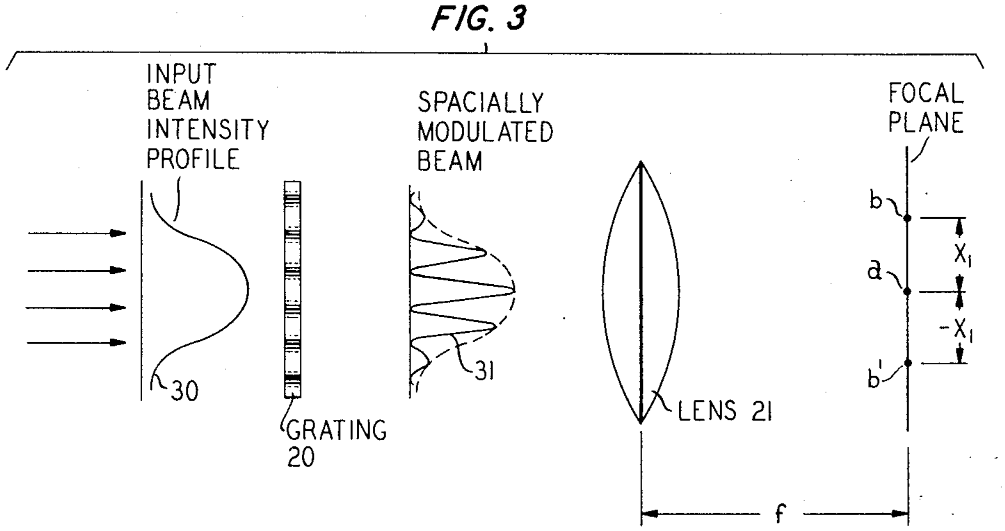
FIG. 3 shows the intensity profile of an optical beam before and after it traverses the encoder, and the resulting spots produced by a converging lens.
Figure 4:
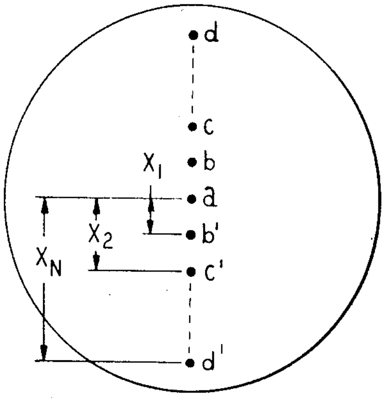
FIGS. 4 and 5 show different spot configurations for different encoding arrangements.
Figure 5:
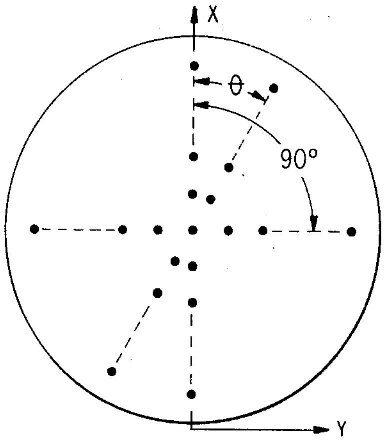

FIG. 3 shows, more specifically, the intensity profiles 30 and 31 of the optical beam (which, for purposes of illustration, is shown to have a Gaussian distribution) before it traverses the grating 20, and the resulting spots produced by lens 21. What is of particular interest in this arrangement is that the magnitude of the distance $x_1$ between the centers of spots $b$ and $a$, and $b'$ and $a$ is uniquely related to the spatial frequency $f_1$ by $$|x_1| = \lambda f f_1\ , \quad (3)$$

where $\lambda$ is the beam wavelength, and $f$ is the focal length of the lens. Accordingly, a grating having a different spacial frequency $f_n$ produces spots having a different spacing $x_n$. Thus, a plurality of beams, each encoded with a different spacial frequency $f_1, f_2, \ldots, f_N$, and focused by the same demultiplexing lens, will produce the pattern illustrated in FIG. 4, where the spots $b,b'$ are produced by frequency $f_1$; spots $c,c'$ are produced by frequency $f_2$; and spots $d,d'$ are produced by frequency $f_N$. If the grating 20 is rotated about an axis through its center and parallel to the beam direction, the axis along which the spots form is similarly rotated. This effect is illustrated in FIG. 5, which shows a first array of spots aligned along a line parallel to the $x$ direction; a second array of spots aligned along a line rotated $\theta$ degrees to the $x$ direction produced by a grating that is rotated through the same $\theta$ degrees; and, finally, a third group of spots aligned along the $y$ direction.

The above-described properties of a converging lens are employed in the present invention as a means of demultiplexing a plurality of differentaly encoded beams so that they can be separately identified. Thus, in accordance with one embodiment of the present invention, the plurality of encoders 14 shown in FIG. 1 comprise gratings of the type described, for spacially modulating a plurality of optical beams prior to multiplexing. Each beam is modulated with a different spacial frequency and, if there are a large enough number, some of the gratings are rotated relative to the others to form the two-dimensional array of spots shown in FIG. 5.

Figure 6:
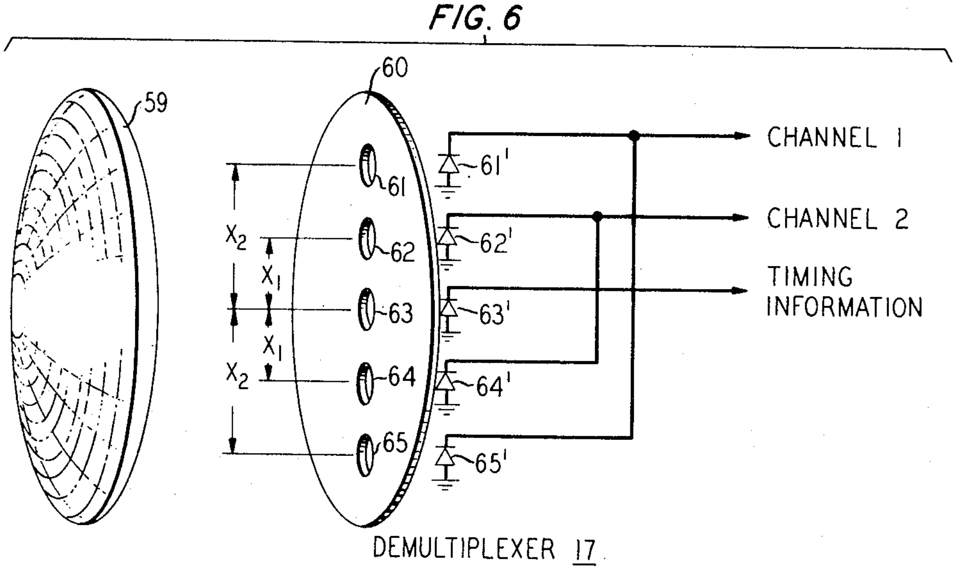
FIGS. 6 and 7 show two different demultiplexers in accordance with the present invention.

Demultiplexing at the receiver is achieved by means of a converging lens and associated means for coupling to the beam components of the various beams. One such arrangement, illustrated in FIG. 6, comprise a converging lens 59 and an array of photodetectors 61′, 62′, 63′, 64′ and 65′ mounted behind a screen 60 having a similar array of apertures 61, 62, 63, 64 and 65. Apertures 63, located along the lens axis, permits the carrier beam component, common to all of the beams, to pass through the screen onto photodetector 63′. The resulting output signal can be used in a PCM system to provide timing information if all the channels share a common clock frequency. Apertures 61 and 65, on the other hand, being equally spaced a specified distance $x_2$ from aperture 63, permit the focused beam components of one of the multiplexed beams to pass through the screen and onto detectors 61' and 65'. The latter are connected together to form a first output signal corresponding to one of the input signals. For purposes of illustration, this signal is identified as channel 1, corresponding to the information signal applied to modulator 12-1. Similarly, apertures 62 and 64, equally spaced a second distance $x_1$ from aperture 63, permit the focused beam components produced by another of the multiplexed beams to pass through the screen and onto photodetectors 62' and 64'. These are likewise connected together to form a second output signal corresponding to a second input signal. In this manner, apertures suitably located in a screen lying in the focal plane of lens 59, pass the beam components of the spacially modulated beams onto selected pairs of photodetectors. Because each of the beams has a uniquely different Fourier transform, it is a simple matter to separate the output signals.

In the particular case where the encoder is uniformly illuminated by the incident beam, the width of the three spots produced at the output screen 60 is given by $$w = 2\pi\lambda f/a \ , \qquad (4)$$

where $a$ is the beam radius. Using amplitude gratings of varying frequencies and orientations to fully utilize screen 60, the total number of beams N (each with a guard space of twice the spot diameter) that can be resolved is given by $$N = \tfrac{1}{2}\ [a^2/2\pi\lambda f]^2 \ . \qquad (5)$$

Using the following typical set of values for the several parameters:

$a = 10$ cm
$\lambda = 10^{-4}$ cm
and
$f = 5 \times 10^3$ cm , we obtain a value of $N = 500$. As a practical matter, scattering effects due to imperfections will reduce this value somewhat. Thus, the exact number of beams that can be multiplexed by the above-described means will, in the last analysis, be limited by the level of cross talk that can be tolerated by the system.

It is a principle advantage of the present invention that the spot locations depend primarily upon the spacial frequencies impressed upon the optical beams and are substantially independent of small displacements of the beam off axis. Accordingly, the system described herein is essentially independent of the usual perturbations that adversely affect prior art spacially multiplexed optical systems.

It will be recognized that the specific details of the various system components described hereinabove are merely intended to be illustrative. For examlpe, instead of using a common signal source and a power divider to obtain a plurality of optical beams, separate sources can be employed. Similarly, multiplexing of the spacially encoded beams can be effected by means known in the art other than mirrors and beam splitters.

It will also be recognized that it is not necessary to include an apertured screen between the output lens and the detectors. It is sufficient to locate the photodetectors in the focal plane of the lens, suitably spaced from the optical axis. However, a screen can be conveniently used to hold the detectors, and inasmuch as it does serve to shield the detectors from spurious signals, it is advantageously included to minimize cross talk.

Figure 7:
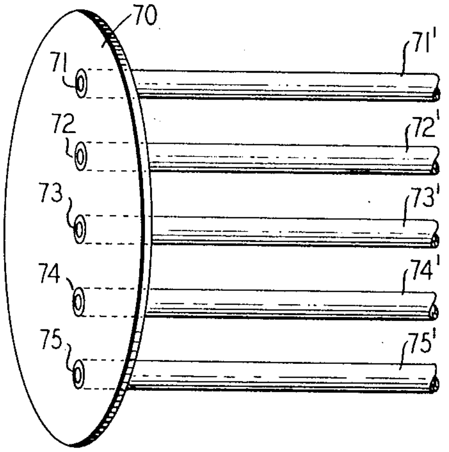

It will also be understood that the demultiplexed beams need not be immediately detected. For example, in FIG. 7 an apertured screen 70 serves to hold a plurality of optical fibers 71, 72, 73, 74 and 75, whose ends are located at the spot locations for the various beams. The fibers can then transmit the demultiplexed beams to the same or different locations for further utilization, as required. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed

1. A spacially multiplexed, optical wave communication system comprising:
a transmitter;
a receiver;
and a wavepath connecting said transmitter to said receiver;
said transmitter including:
means for generating a plurality of optical beams;
encoding means for impressing a different spacial modulation upon the intensity profile of each of said beams;
and means for spacially multiplexing said beams for propagation along said wavepath;
said receiver including a demultiplexer comprising:
a converging lens for performing a two-dimensional Fourier transformation upon said beams, producing for each beam a unique array of beam components;
and means for coupling said beam components to the rest of said receiver.

2. The system in accordance with claim 1 wherein:
said encoding means comprises a plurality of gratings, each having a sinusoidally varying transmittance characteristic along a first transverse direction normal to the direction of beam propagation, and a constant transmittance characteristic along a second transverse direction normal to said first direction.

3. The system in accordance with claim 2 wherein:
the transmittance characteristic of each of said gratings has a different spacial frequency.

4. The system in accordance with claim 2 wherein:
the direction along which said transmittance varies is different for different ones of said gratings.

5. The system in accordance with claim 1 wherein:
said wavepath includes an odd number of converging lenses;
and wherein said converging lens of said demultiplexer is the last lens in said wavepath.

6. The system in accordance with claim 1 wherein:
said converging lens is disposed between said wavepath and the rest of said receiver.

7. The system in accordance with claim 1 wherein:

said coupling means includes a plurality of optical fibers whose input ends are located in the focal plane of said converging lens.

8. The system in accordance with claim 1 wherein: said coupling means includes a plurality of photodetectors located in the focal plane of said converging lens.

9. In an optical communication system, the combination comprising:

means for producing a plurality of optical beams;
means for encoding each of said beams with a different spacial modulation;
means for combining said beams for transmission along a common wavepath;
and means for demultiplexing said beams including a convex lens for performing a two-dimensional Fourier transformation upon said beams.

* * * * *